(12) United States Patent
Singh

(10) Patent No.: US 9,728,286 B2
(45) Date of Patent: Aug. 8, 2017

(54) SYSTEM FOR LOW PROFILE TRANSLATION OF HIGH LEVEL RADIOACTIVE WASTE

(71) Applicant: Holtec International, Inc., Marlton, NJ (US)

(72) Inventor: Krishna P. Singh, Hobe Sound, FL (US)

(73) Assignee: Holtec International, Inc.

( * ) Notice: Subject to any disclaimer, the term of this patent is extended or adjusted under 35 U.S.C. 154(b) by 711 days.

(21) Appl. No.: 13/731,803

(22) Filed: Dec. 31, 2012

(65) Prior Publication Data

US 2014/0186144 A1    Jul. 3, 2014

Related U.S. Application Data

(63) Continuation of application No. 12/024,071, filed on Jan. 31, 2008, now Pat. No. 8,345,813.

(60) Provisional application No. 60/887,505, filed on Jan. 31, 2007.

(51) Int. Cl.
*G21C 19/32* (2006.01)
*G21F 5/14* (2006.01)

(52) U.S. Cl.
CPC ............. *G21C 19/32* (2013.01); *G21F 5/14* (2013.01)

(58) Field of Classification Search
CPC ..... G21F 5/00; G21F 5/06; G21F 5/08; G21F 5/14; B62D 61/12; B60B 33/06; B60P 3/42
USPC ........................................................ 376/272
See application file for complete search history.

(56) References Cited

U.S. PATENT DOCUMENTS

| | | | |
|---|---|---|---|
| 1,973,372 A | | 9/1934 | Clapp |
| 2,671,242 A | * | 3/1954 | Lewis ............... B60B 33/06 16/26 |
| 3,732,427 A | | 5/1973 | Trudeau et al. |
| 4,355,584 A | * | 10/1982 | White, Jr. ............... 105/72.2 |
| 4,704,539 A | * | 11/1987 | Dequesnes et al. ....... 250/506.1 |
| 5,839,874 A | | 11/1998 | Johnston |
| 5,885,048 A | | 3/1999 | Barth |
| 6,017,181 A | | 1/2000 | Johnston |
| 6,328,524 B1 | | 12/2001 | Johnston |

FOREIGN PATENT DOCUMENTS

GB          1398348          6/1975

* cited by examiner

*Primary Examiner* — Jack W Keith
*Assistant Examiner* — Sharon M Davis
(74) *Attorney, Agent, or Firm* — The Belles Group, P.C.

(57) ABSTRACT

An apparatus, system and method for handling and translating high level radioactive waste. The apparatus comprises a body for supporting the cask close to the ground so that the cask and the apparatus can pass underneath over head doors. The apparatus further comprises rollers for translating the cask. The apparatus additionally supports the storage cask during spent nuclear fuel transfer procedures.

22 Claims, 9 Drawing Sheets

SYSTEM FOR LOW PROFILE TRANSLATION OF HIGH LEVEL RADIOACTIVE WASTE

CROSS-REFERENCE TO RELATED APPLICATIONS

The present application is a continuation of U.S. patent application Ser. No. 12/024,071, filed Jan. 31, 2008, now U.S. Pat. No. 8,345,813, which in turn claims the benefit of U.S. Provisional Patent Application Ser. No. 60/887,505, filed Jan. 31, 2007, the entireties of which are incorporated herein by reference.

FIELD OF THE INVENTION

The present invention relates generally to apparatus, systems and methods for transporting high level waste "HLW"), such as spent nuclear fuel rods, and specifically to low profile translation of high level waste containment casks.

BACKGROUND OF THE INVENTION

In the operation of nuclear reactors, the nuclear energy source is in the form of hollow zircaloy tubes filled with enriched uranium, typically referred to as fuel assemblies. When the energy in the fuel assembly has been depleted to a certain level, the assembly is removed from the nuclear reactor. At this time, fuel assemblies emit both considerable heat and extremely dangerous neutron and gamma photons (i.e., neutron and gamma radiation). Thus, great caution must be taken when the fuel assemblies are handled, transported, packaged and stored. To protect the environment from radiation exposure, spent nuclear fuel is both transported and stored in large cylindrical containers called casks. A transfer cask is used to transport spent nuclear fuel between locations while a storage cask is used to store spent nuclear fuel for a determined period of time.

Casks are typically designed to shield the environment from the dangerous radiation in two ways. First, shielding of gamma radiation requires large amounts of mass. Gamma rays are best absorbed by materials with a high atomic number and a high density, such as concrete, lead, and steel. The greater the density and thickness of the blocking material, the better the absorption/shielding of the gamma radiation. Second, shielding of neutron radiation requires a large mass of hydrogen-rich material. One such material is water, which can be further combined with boron for a more efficient absorption of neutron radiation.

The transfer cask must perform the vital function of providing adequate radiation shielding for both neutron and gamma radiation emitted by the enclosed spent nuclear fuel. The transfer cask must also be designed to provide adequate heat transfer. Guided by the shielding principles discussed above, transfer casks are made of lead or a gamma absorbing material and contain a neutron absorbing material as well. As stated previously, greater radiation shielding is provided by increased thickness and density of the gamma and neutron absorbing materials. The weight of a fully loaded transfer cask is typically in the range of 100-125 tons.

Similarly, storage casks are designed to be large, heavy structures made of steel, lead, concrete and an environmentally suitable hydrogenous material. However, because storage casks are not handled as much as transfer casks, the primary focus in designing a storage cask is to provide adequate radiation shielding for the long-term storage of spent nuclear fuel. Size and weight are at best secondary considerations. As a result of maximizing the thickness of radiation absorbing materials, the weight and size of storage casks often cause problems associated with lifting and handling. Typically, storage casks weigh approximately 150 tons and have a height greater than 15 ft. A common problem is that storage casks cannot be lifted by nuclear power plant cranes because their weight exceed the rated capacity of the crane.

A common problem arises when the fully loaded transfer cask must be transported to the storage cask for the canister transfer procedure. Generally, the storage cask is located in a truck bay, or other location outside of the staging area. To get to the transfer cask, the storage cask may have to pass through a door of a nuclear planes truck bay. The doors are typically 17-24 feet tall. The transfer casks are typically about 16 feet and 3 inches tall. The need to move casks into and out of enclosed facilities limits the size and shape of machines that can be used to move the casks. For example, a low ceiling in such a facility makes it impractical to use a boom or overhead crane to lift and transport casks. Similarly, a doorway not much larger than the cask itself limits the extent to which a lifting device can extend beyond the sides, top or bottom of the cask. Thus, a need exists for a low profile transporter that can withstand the weight of the storage cask.

SUMMARY OF THE INVENTION

It is therefore an object of the present invention to provide an apparatus for translating casks having a low profile.

It is another object of the present invention to provide an apparatus for translating casks that can withstand high moment forces.

A further object of the present invention is to provide an apparatus for translating casks that can be raised and lowered.

A still further object of the present invention is to provide an apparatus for translating casks that can fit through an overhead, door.

Another object of the present invention is to provide an apparatus that supports a cask during spent nuclear fuel transfer procedures.

A still further object of the present invention is to provide an apparatus that can translate a cask close to the surface of the ground while avoiding interference with irregularities on the floor surface.

A yet further aspect of the present invention is to provide an apparatus for translating casks that has a variable height.

These and other objects are met by the present invention which in one aspect can be an apparatus for translating a nuclear waste storage cask comprising: a body for supporting a cask; and at least two rollers adapted to move between a retracted position and an extended position, wherein when the rollers are in the retracted position, the rollers do not contact a ground surface.

In another aspect the invention can be an apparatus for translating a cask comprising: a body comprising a top surface, an open top end and a cavity for receiving a cask, at least one support member for supporting a cask close to a ground surface; and rollers for translating the apparatus.

In a yet further aspect the invention can be A system for translating spent nuclear fuel comprising: an apparatus for supporting and translating a cask comprising: a body having an open top end and a cavity for receiving a cask; and at least two rollers adapted to move between a retracted position and an extended position; a cask positioned in the cavity, wherein the cask is supported close to a ground surface.

In another aspect the invention can be a method of supporting and translating a storage cask comprising the steps of: (a) providing an apparatus comprising: to body for supporting a cask; and at least two rollers adapted to move between a retracted position and an extended position (b) placing a cask onto the body of the apparatus; loading spent nuclear fuel into the cask; (c) moving the rollers of the apparatus into the extended position; and (d) translating the apparatus.

In yet another aspect, the invention can be a system for translating high level radioactive waste across a ground surface, the system comprising: a cask loaded with high level radioactive waste; an apparatus comprising: a body having a cavity having an open top end; and a plurality of rollers coupled to the body to be adjustable between: (1) an extended position in which the plurality of rollers contact the ground surface and support the body above the ground surface; and (2) a retracted position in which the plurality of rollers do not contact the ground surface and the body contacts the ground surface; and the cask positioned in the cavity, the cask supported above the ground surface by the apparatus when the plurality of rollers are in the extended position.

In still another embodiment, the invention can be a system for translating high level radioactive waste across a ground surface, the system comprising: a cask loaded with high level radioactive waste; an apparatus comprising: a body having a cavity having an open top end; a plurality of rollers coupled to the body; and at least one contact member coupled to the body and extending into the cavity; a lower portion of the cask positioned in the cavity so that the cask rests atop the at least one contact member and is above the ground surface, an upper portion of the cask protruding from the open top end of the cavity.

In a further embodiment, the invention can be a system for translating high level radioactive waste across a ground surface, the system comprising: a cask loaded with high level radioactive waste; an apparatus comprising: a body having a cavity having an open top end; and a plurality of rollers coupled to the body; the cask supported by the apparatus above the ground surface so that a lower portion of the cask is positioned within the cavity and an upper portion of the cask protrudes from the open top end of the cavity.

DETAILED DESCRIPTION OF THE DRAWINGS

Figure 1:
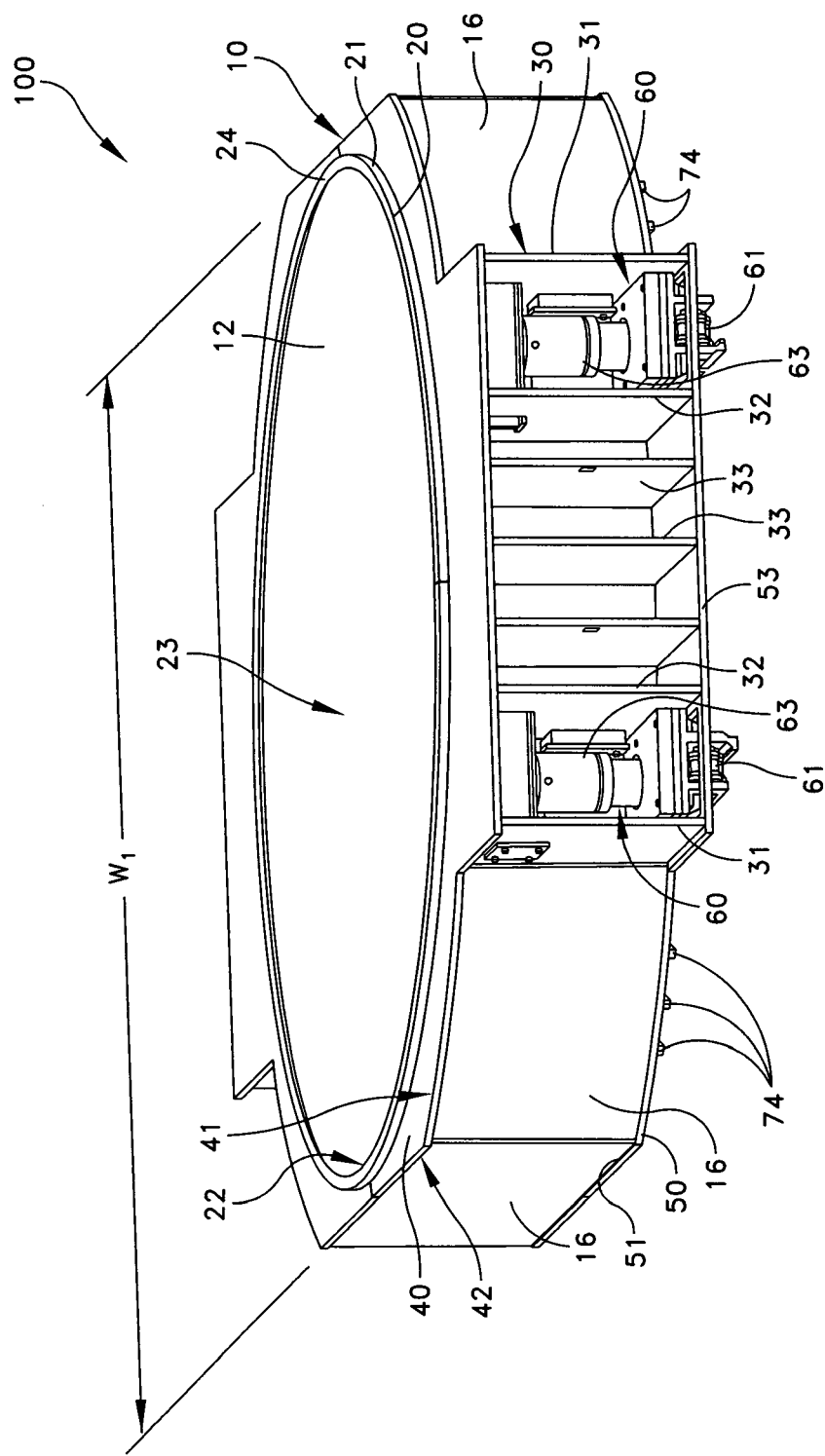
FIG. 1 is a top perspective view of a low profile transporter according to one embodiment of the present invention.
Figure 9:
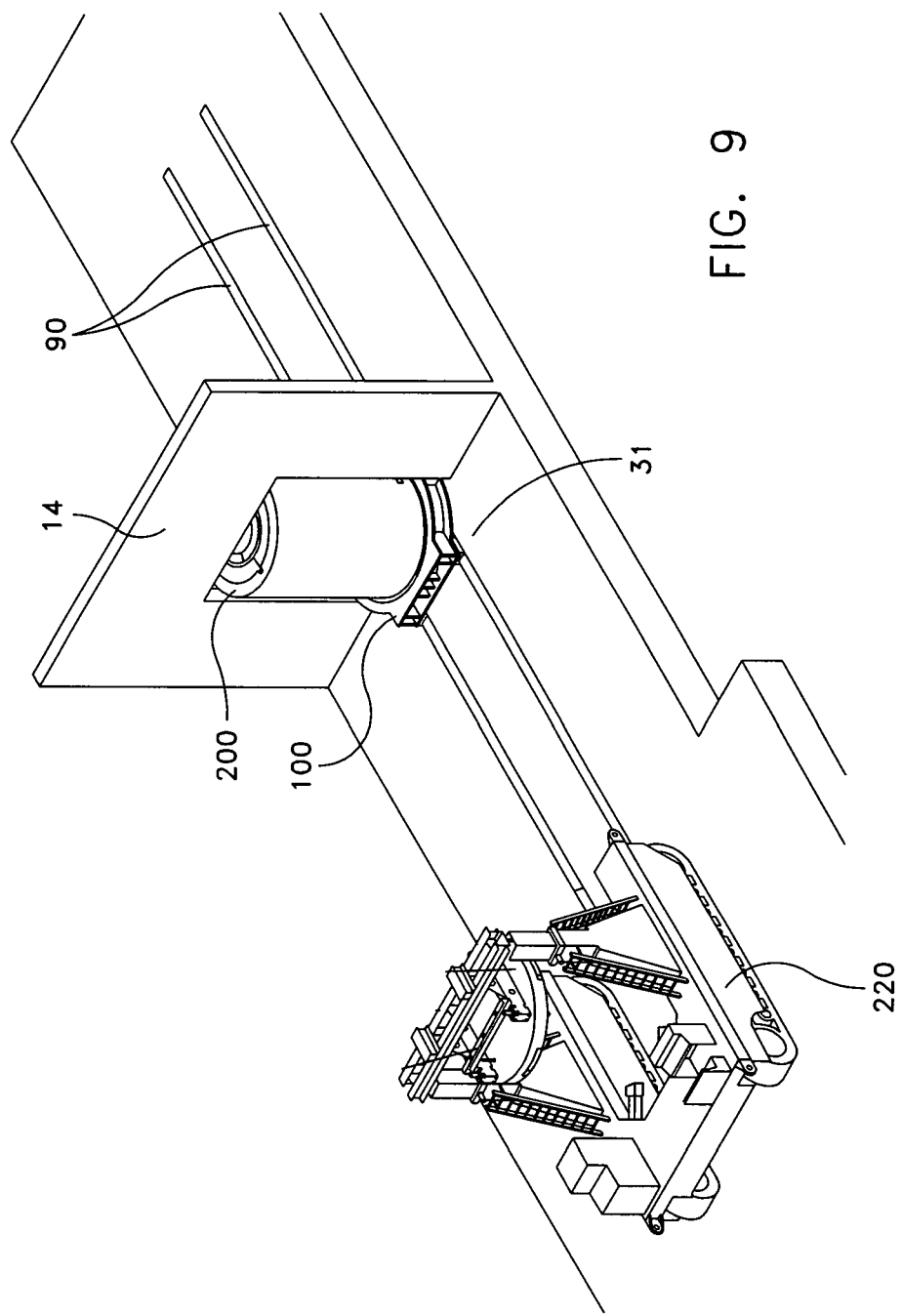
FIG. 9 is a perspective view of the low profile transporter and cask of FIG. 7 translating under an over head door according to one embodiment of the present invention.

FIG. 1 is a front perspective view of a low profile transporter ("LPT") 100. The LPT 100 translates casks that are used in the handling and storing of spent nuclear fuel, such as storage casks used in the long-term dry storage of spent nuclear fuel. The LPT 100 is not limited to storage casks, however and other types of casks and/or structures can be translated in the LPT 100. The LPT 100 supports and translates loads in excess of 200 tons and high overturning moments without deforming. As will be discussed below, the LPT 100 carries the cask close to the ground while avoiding interference with the irregularities in the ground surface. The LPT 100 can either ride in tracks 90 on the ground surface 6 (shown in FIG. 9) or move along the ground surface 6 itself. Preferably, as will be discussed in greater detail below, the LPT 100 supports and translates a cask so that the top surface of the cask is less than 24 feet from the ground. Additionally, the LPT 100 has a width W1 that allows it to fit through standard over head door. The LPT 100 is designed so that its width W1 is smaller than its length.

Figure 2:
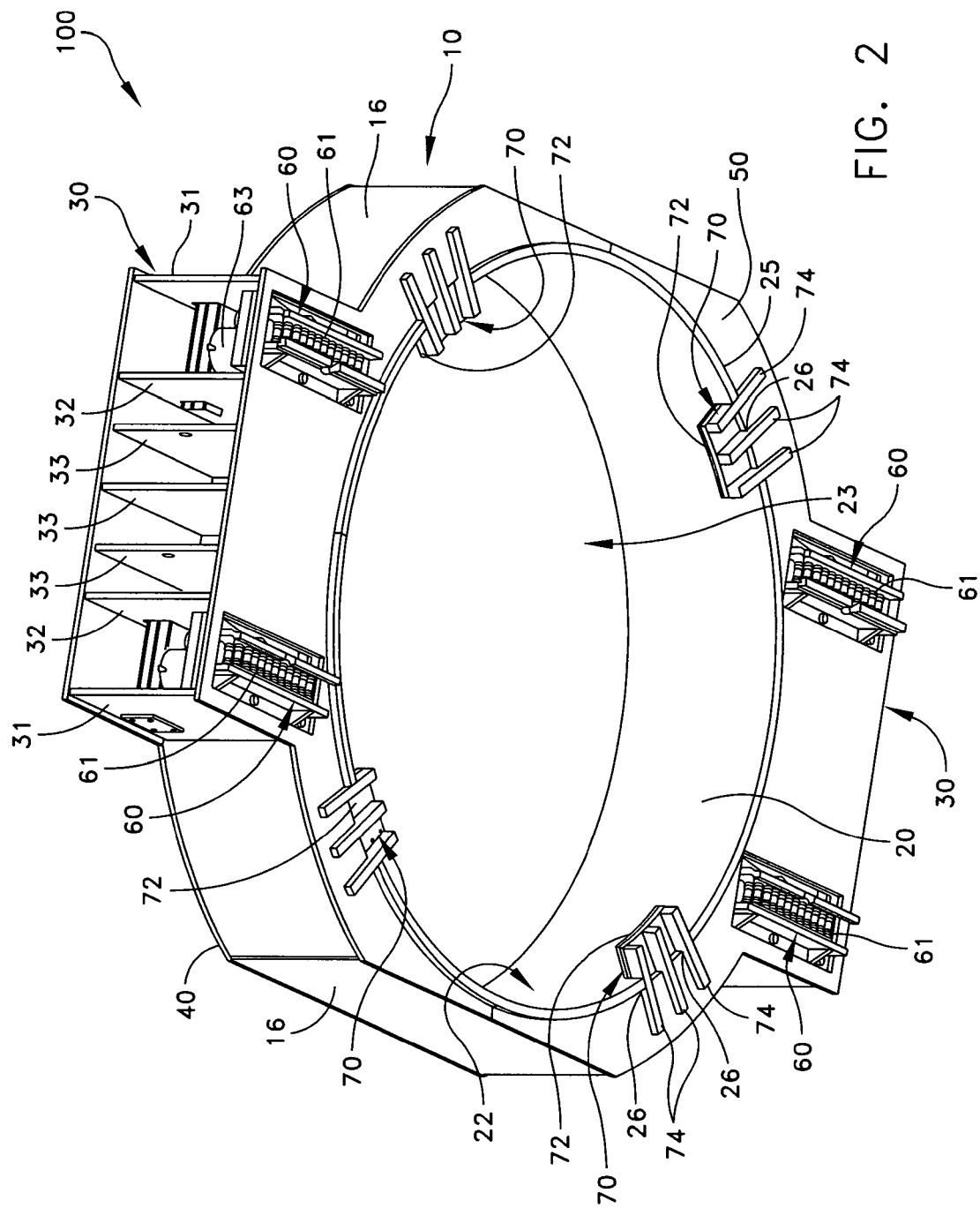
FIG. 2 is a bottom perspective view of the transporter of FIG. 1 according to one embodiment of the present invention.

Referring to FIGS. 1 and 2, the LPT 100 generally comprises a body 10 and roller assemblies 60. The body 10 has an open top end 12 and a cavity 23 for receiving a cask. The cavity 23 has a horizontal cross-sectional profile that is circular. The diameter of the cavity 23 is slightly larger than the diameter of the cask 200 (shown in FIG. 7) to be loaded therein. Preferably, there is a small clearance between the cask. 290 (shown in FIG. 7) and the body 10 equal to about ½ inch to 1 inch. The invention is not so limited however, and the size and shape of the cavity 23 will vary depending upon the size and shape of the cask to be positioned therein so long as the small clearance is maintained between the cask and the body 10.

The roller assemblies 60 include rollers 61 that allow for the translation of the LPT 100. The roller assemblies are positioned at opposite ends of the LPT 100 so that the width W1 of the LPT 100 is minimized. When the LPT 100 is in motion, the rollers 61 are at the lead and trail ends of the motion. This makes it easier for the LPT 100 to fit through narrow passageways like overhead doors. Additionally, as will be discussed in further detail below with reference to FIGS. 4 and 5, the roller assemblies 60 are designed so that the rollers 61 can be extended and retracted in the vertical direction between a fully extended position and a fully retracted position. When the rollers 61 are in the extended position, the rollers 61 contact the ground and support the full weight of the ZPT 100 and its load. When the rollers 61 are in the retracted position, they are moved in the vertical direction so as to be raised from the ground so that the rollers no longer support the weight of the ZPT 100 or its load. Preferably, when the rollers 61 are in the fully extended position, the height of the LPT 100 is less than 37 inches.

The body 10 comprises a ring 20, an upper plate 40 and a lower plate 50. The ring 20 has an outer surface 21, an inner surface 22, a top surface 24 and a bottom surface 25.

The ring 20 is preferably made of steel between 2 and 4 inches in thickness. The invention is not so limited, however, and other materials, including but not limited to other metals, may be used. The thickness of the ring 20 will vary depending upon the material used to form the ring 20. The inner surface 22 of the ring 20 forms the cavity 23 for receiving a cask. The ring 20 further comprises a plurality of notches 26 at the bottom surface 25. The notches 26 are rectangular shaped cutouts that will be discussed in more detail below.

The upper plate 40 and the lower plate 50 are connected to the outer surface 21 of the ring 20 and provide structural robustness to the LPT 100. The upper plate 40 is connected to the outer surface 21 of the ring 20 at or near the top surface 24. The upper plate 40 extends laterally from the outer surface 21 of the ring 20. The upper plate 40 comprises a top surface 41 and a bottom surface 42. The ring 20 is fitted into an opening (not visible) in the upper plate 40 and then the tipper plate 40 and the ring 20 are welded together along their connection area. Other attachment means between the ring 20 and the upper plate 40 may be used, such as bolts, fasteners and/or fastening techniques, if desired. Alternatively the ring 20 and the upper plate 40 could be a unitary structure. The upper plate 40 is preferably made of steel and/or other metals. Where the upper plate 40 is made of steel, it is preferably between 1 and 2 inches thick.

The lower plate 50 is connected to the ring 20 at or near the bottom surface 25 of the ring 20. The lower plate 50 comprises a top surface 51 and a bottom surface 52. The ring 20 is fitted into an opening (not visible) in the lower plate 50 and the ring 20 and the lower plate 50 are then welded together along, their contact area. Other attachment methods may be used however including mechanical means like bolts, fasteners and the like. The lower plate 50 is preferably made of steel having a thickness of between 1 and 2 inches. The invention is not so limited, however, and other materials of various thicknesses may be used.

The body 10 of the LPT 100 further comprises cover plates 16. The cover plates 16 are positioned spaced from the outer surface 21 of the ring 20 and extend from the bottom surface 42 of the upper plate 40 to the top surface 51 of the lower plate 50. The cover plates 16 are preferably made of steel or another metal. The invention is not so limited, however, and other materials may be used. The cover plates are preferably welded to the upper and lower plates 40, 50. Other attachment means may be used however, including, mechanical means such as brackets, bolts, fasteners and the like.

The upper plate 40 and the lower plate 50 protrude at the front and rear end of the LPT 100 so as to form the top and bottom, respectively of two housings 30 for the roller assemblies 60. The housings 30 for the roller assemblies 60 are positioned equidistant from each other, or 180 degrees apart. Each housing 30 comprises two outer plates 31 and two inner plate 32 that surround the roller assemblies 60. The outer plates and the inner plates 31, 32 extend laterally from the cover plate 16 to the lateral edge of 53 of the lower plate 50. The outer and inner plates 31, 32 additionally extend from the bottom surface 42 of the upper plate 40 to the top surface 51 of the lower plate 50. Preferably, the outer plates 31 of the housing 30 are welded to the cover plate 16 and to the upper and lower plates 40, 50. Other attachment means may be used however, including mechanical means such as fasteners, bolts, brackets and the like. The inner and outer plates 31, 32 are preferably 2 to 4 inches thick and made of steel. Other materials of different thicknesses may be used however, including other metals, so long as the robustness of the LPT 100 is maintained.

The housing 30 further comprises a plurality of reinforcement plates 33 for structural stability. There are three reinforcement plates 33 positioned between the inner plates 32 and extending from the top plate 40 to the bottom plate 50. Preferably, the reinforcement plates 33 are welded to the top plate and the bottom plate 50, but other attachment means may be used. The reinforcement plates 33 extend laterally from the cover plate 16 to the lateral edge 53 of the lower plate 50 and are preferably welded to the cover plate 16.

The LPT 100 further comprises a plurality of support members 70. In the illustrated embodiment there are four support members 70. The invention is not so limited, however, and more or less support members 70 may be used so long as they can support the weight of a fully loaded storage cask. In operation, the support members 70 contact a cask to be supported and translated in the LPT 100. Each one of the support members 70 comprises a contact plate 72 and three support plates 74. As will be discussed in further detail with reference to FIG. 3, the support plates 74 are L-shaped plates having a portion which extends into the cavity 23 near the bottom of the cavity 23. The support plates 74 extend through the notches 26 in the ring 20. The notches 26 are slightly larger than the support plates 71 in order provide a passageway for the support plates 74 of the support members 70 to extend through the ring 20 into the cavity 23. Preferably the support plates 71 are welded to the ring 20 so that there is no movement between the support members 70 and the ring 20. The contact plate 72 is connected with the portion of support plate 74 that extends into the cavity 23. The contact plate 72 also contacts and supports a shoulder of the cask. The shoulder of the cask could either be an opening or cutout in an outer surface of the cask or a ledge, ridge, flange or other protrusion from the outer surface of the cask. The contact plate 72 is a rectangular plate made of two sections, a top section 75 and a bottom section 76. The top section 75 is in surface contact with the cask and is therefore made of a softer material so as to not damage the cask. The bottom section 76 is made of steel of another metal. The top section and bottom section 75, 76 of the contact plate 72 are connected to each other using either mechanical means, welding or gluing. The contact plate 72 is positioned near the bottom of the cavity 23 and are sufficiently robust to support the weight of a cask loaded into cavity 23. Additionally, the contact plate 72 could be a ring rather than rectangular plates, additionally, the contact plate 52 could be a bar extending the entire diameter of the body 20, so long as a surface that engages the cask is created.

Figure 3:
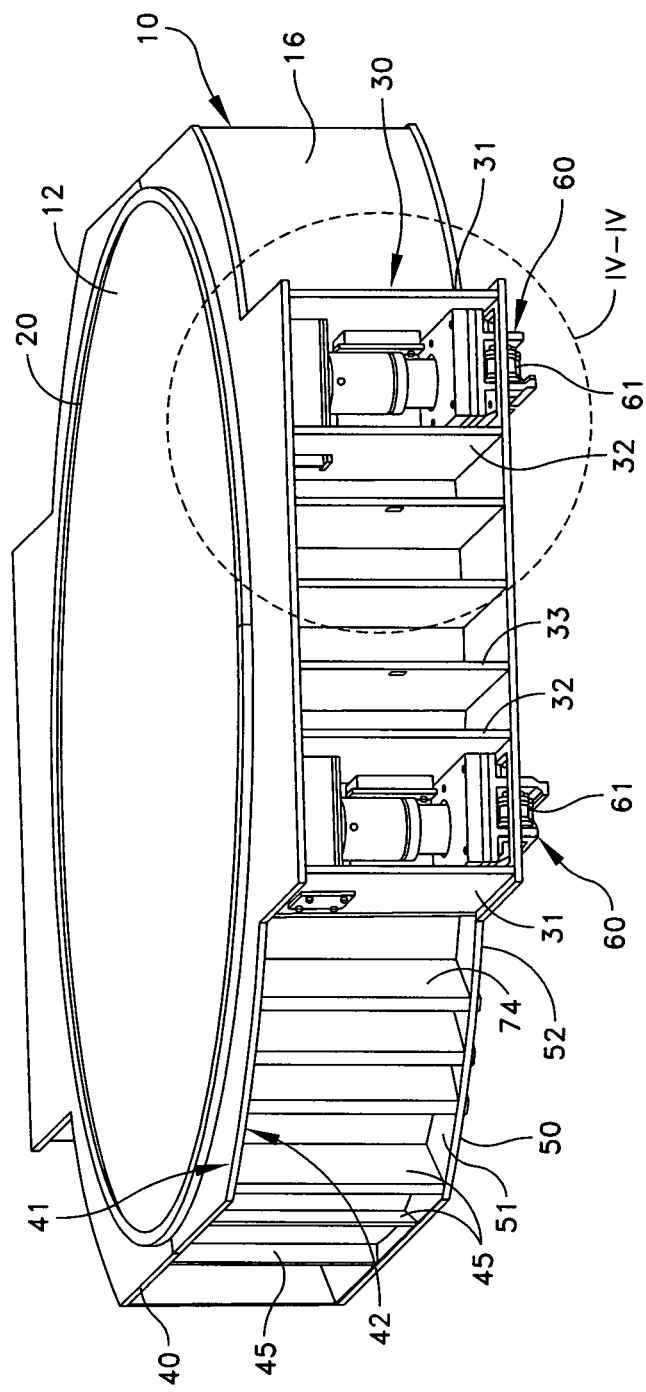
FIG. 3 is a top perspective view of the transporter of FIG. 1 with a cover plate removed on one side of the transporter according to one embodiment of the present invention.

Referring now to FIG. 3, the LPT 100 is shown with a cover plate 16 removed on one side. The support plates 74 of the support members 70 are attached to the outer surface 22 of the ring 20. The support plates 74 extend from the bottom surface 42 of the upper plate 40 and through slots in the bottom plate 50 so that a bottom portion of the support plates 74 extends through the bottom plate 50. The support plate 74 additionally extends laterally from the body 20 to the cover plate 16 (shown in FIG. 2). The support plate 74 is preferably welded to the body 20, but other attachment means may be used. Each support member 70 comprises three support plates 74, but the invention is not so limited, and more or less support plates 74 may be used so long as the support member 70 is able to withstand the weight of a fully loaded storage cask without deforming.

The LPT 100 further comprises a plurality of reinforcement plates 45 are attached to the outer surface 21 of the ring 20 to provide structural integrity. The reinforcement plates 45 are arranged in series around the outer surface 23 of the ring 20. FIG. 3 shows three reinforcement plates 45. The invention is not so limited however and there could be less or more reinforcement plates 45 per group, arranged closer or farther apart along the ring 20. The reinforcement plates 45 are generally rectangular in shape and preferably made of steel and/or other metals. The invention is not so limited however, and the shape and material of the reinforcement plates 45 can vary. The reinforcement plates 45 extend between the top and bottom plates 40, 50 and are preferably attached to the top and bottom plates 40, 50 by welding. Other attachment means may be used, such as bolts, fasteners and/or fastening techniques, if desired.

Figure 4:
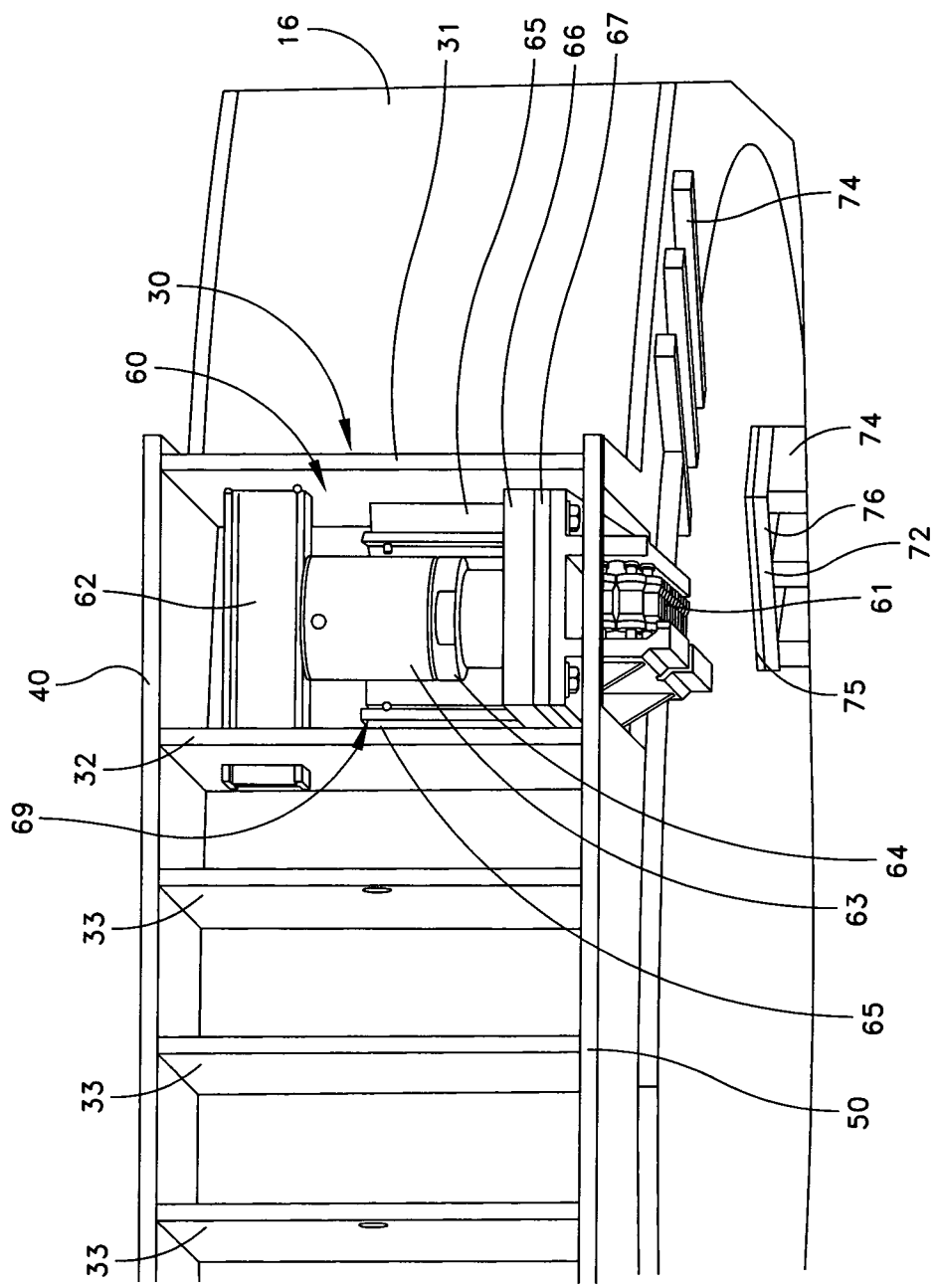
FIG. 4 is a close-up perspective view of section IV-IV of FIG. 3 according to one embodiment of the present invention.

Referring now to FIG. 4, a close-up view of section IV-IV of FIG. 3 showing the roller assembly 60 is illustrated so that its various components and their interaction with one another is more clearly visible. The roller assembly 60 comprises rollers 61, a horizontal beam 62, a jack 63, a locking ring 64, low-friction plates 65 and base plate 66. The jack 63 is designed to raise and lower the rollers 61 between the fully extended position (illustrated) and the fully retracted position (not shown). When the rollers 61 are in the fully retracted position, they do not contact a ground surface.

As shown in FIG. 2, the LPT 100 comprises tour roller assemblies each having, a jack 63. The four jacks 63 are hydraulic jacks having hydraulic hoses (not illustrated) extending from a power skid unit not illustrated) comprises controls for operating, the jacks 63. The jacks 63 are designed to work in conjunction with each other so that no jack 63 will lift or lower the roller 61 independent of the other jacks. This avoids the tipping of the LPT 100. Additionally, other means of controlling the jacks 63 may be used including via motors that powered remotely of the LPT 100. The locking ring 64 is designed to keep the jack 63 from accidentally releasing and thereby dropping the load in the LPT 100. The locking ring 64 is a metal ring, that is threaded on its inner surface. When the jack 63 is powered so that the rollers 61 are in the extended position, the locking ring is locked into place so that loss of hydraulic power to the jack 63 will not cause the load to be dropped. The rollers 61 are bolted to the base plate 66 which comprises an indentation 68 (shown in FIG. 5) for the cylinder of the jack 63. The indentation 68 keeps the jack 63 from moving in the lateral direction.

The base of the jack 63 is connected to the horizontal beam 62. The horizontal beam 62 is a steel I-beam that spans between the inner plate 31 and the outer plate 32. The ends of the horizontal beam 63 extend through openings in the inner and outer plates 31, 32. A cover is put on the end of the horizontal beam 63 that protrudes from the outer plate 32. The cover is bolted to the outer surface of the outer plate 31.

The low-friction plates 65 are rectangular shaped pads made of nylon or another low-friction material having the capability to withstand high compression loads. The low-friction plates 65 are positioned between a vertical beam 69 and the outer and inner plates 31, 32 of the housing 30. When the jack 63 moves the rollers vertically, the low-friction plates 65 move along the outer and inner plates 31, 32. The low friction plates 65 provide support for the roller assembly 60 so that the rollers 61 do not supinate or pronate, meaning the roller assembly 60 does not bend inwards or outwards (horizontally) at any point from the moment forces caused by the weight of the load in the LPT 100. Rather the roller assembly 60 moves only vertically.

The roller assembly 60 further comprises a shims 67. The shim 67 is preferably a rectangular thin metal plate, such as steel or aluminum. The shim 67 can be constructed of other materials and in other shapes if desired. The shim 67, provide a simple way to change the overall height of the LPT 100 because the height of the shim 67 can be easily varied. The shims 67 are positioned between the base plate 66 and the rollers 61. The rollers 61 are best illustrated in FIG. 5.

Figure 5:
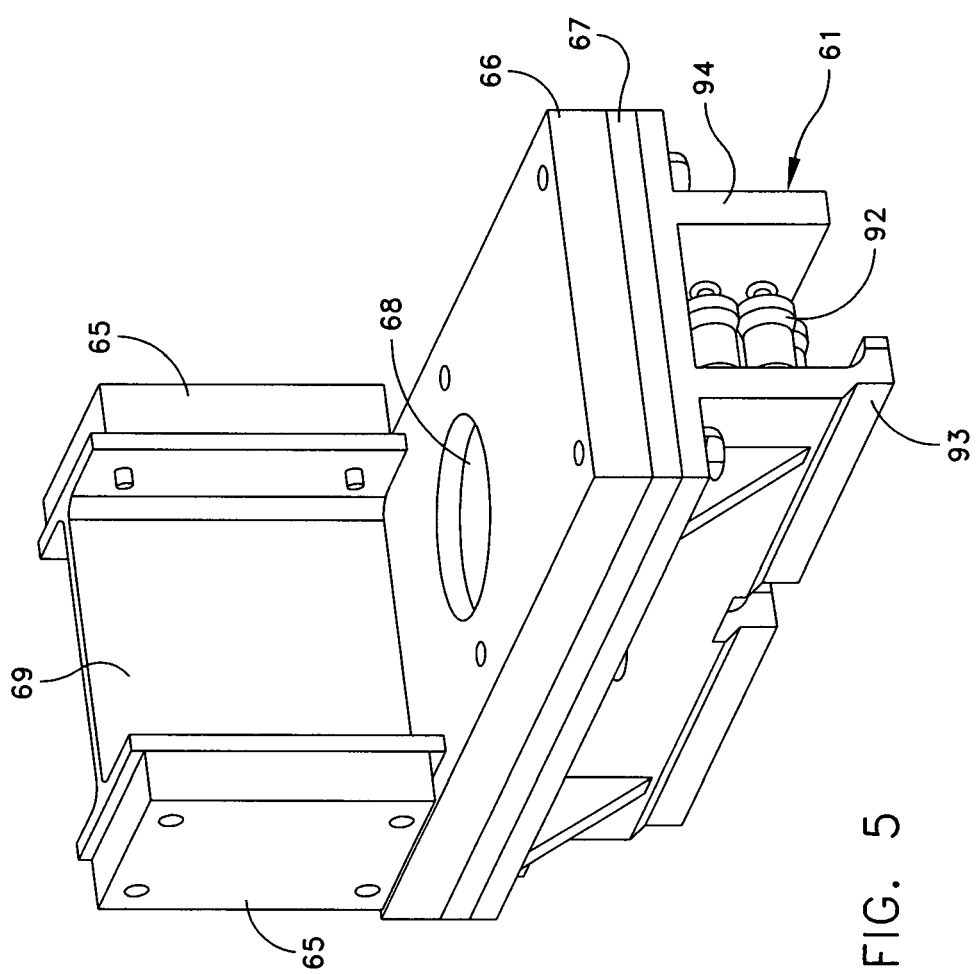
FIG. 5 is a perspective view of the a roller assembly of the low profile transporter according to one embodiment of the present invention.

Referring to FIG. 5, a roller 61 is illustrated removed from the LPT device 100. Although a particular roller design is illustrated, the rollers 61 can be any kind of linear motion device including devices commercially available. The rollers 61 comprise wheels 92, inner plate 93 and outer plate 94. The inner and outer plates 93, 94 keep the wheels 92 vertically in line so that they do not supinate or pronate. The inner and outer plates 93, 94 additionally acts as a connection to a rail of a track (shown in FIG. 8) in the ground surface that may be used with the LPT 100.

Figure 6:
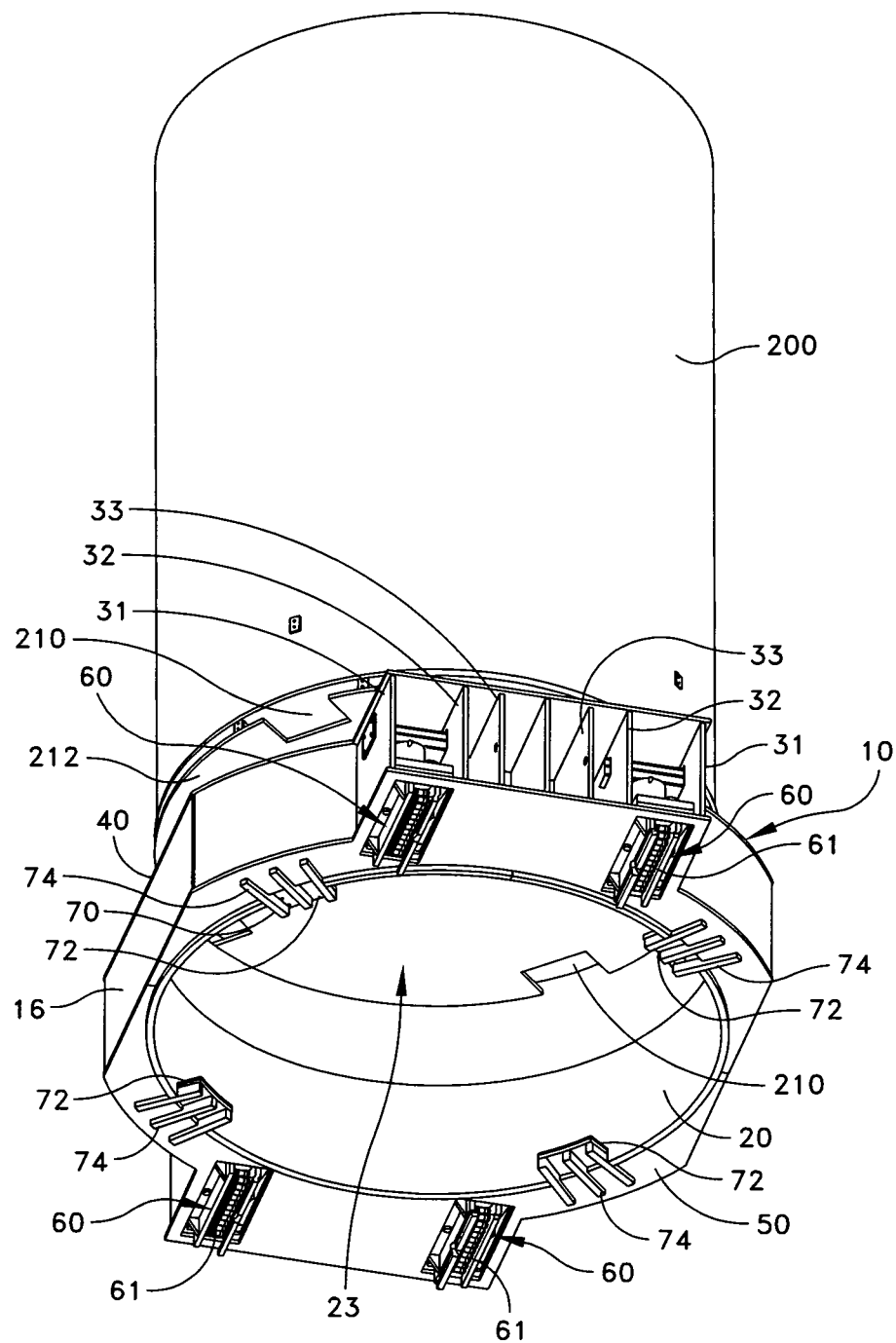
FIG. 6 is a bottom perspective view of the low profile transporter of FIG. 1 and a cask positioned above the low profile transporter according to one embodiment of the present invention.

Referring now to FIG. 6, a cask 200 is shown positioned above the LPT 100. A cutout 210 can be seen in the bottom surface 212 of the cask 200. As stated previously, the cask 200 could have a ridge or lug extending outwardly to engage with support members 70. The cutout 210 is aligned with the contact plate 72 so that the cask 200 can be lowered through the open top end of the body 20, into the cavity 23 until the contact plate 72 slides through the cutout 210 and engages the cask 200, as shown in FIG. 7.

Figure 7:
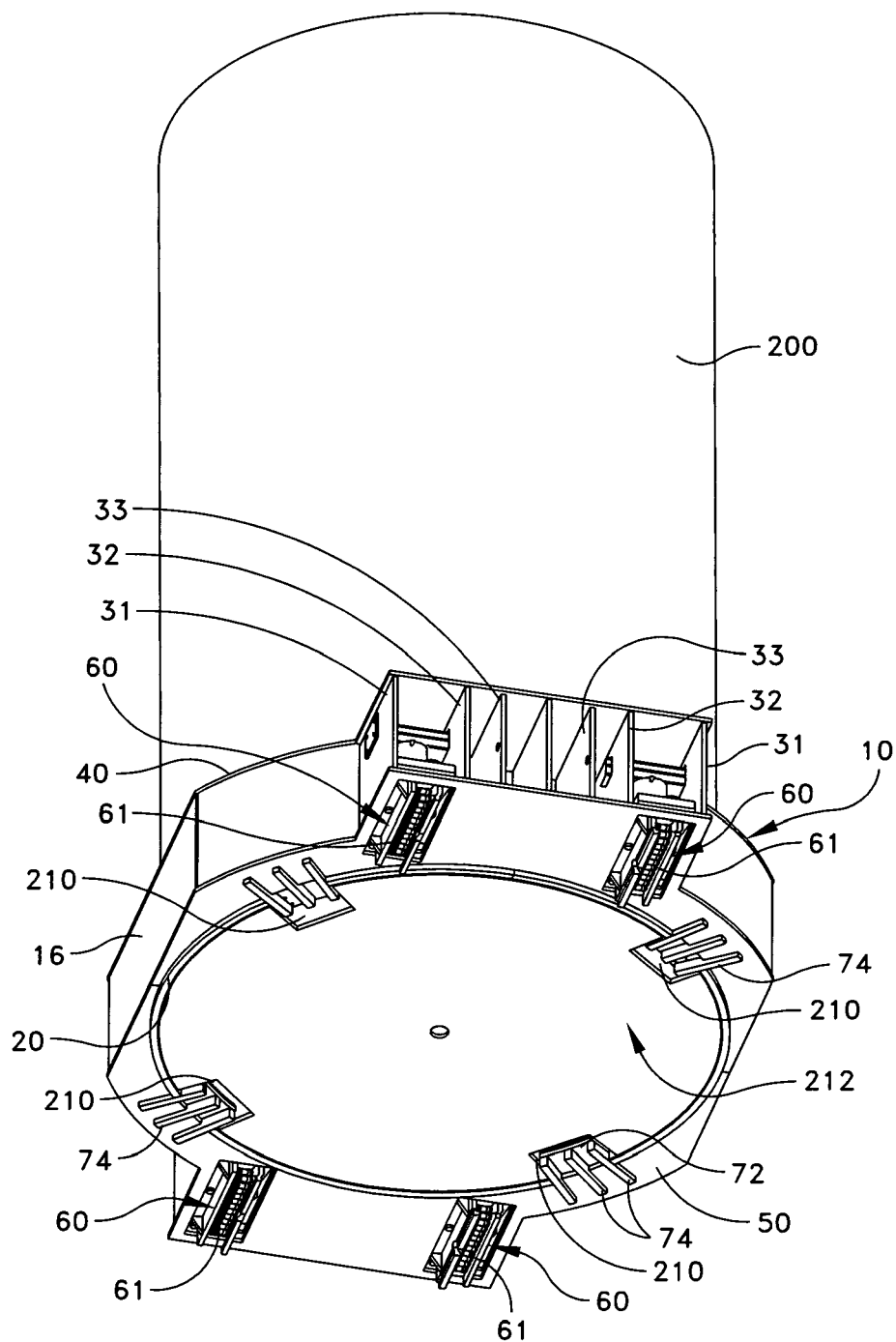
FIG. 7 is a bottom perspective view of the low profile transporter and cask of FIG. 6 with the cask positioned in the low profile transporter according to one embodiment of the present in invention.

Referring now to FIG. 7, the cask 200 is shown positioned in the LPT 100. The contact plates 72 are positioned close to the bottom plate 50 of the LPT 100 so that when the cask 200 rests on the support members 70, the cask 200 can sit as close to the ground floor 6 as possible without the bottom surface 212 engaging the irregularities in the floor surface 6 (shown in FIG. 8). Preferably the distance between the bottom surface 212 of the cask 200 and the surface of the ground floor 6 is between 0.1 and 6 inches, more preferably between 0.1 and 3 inches, and most preferably between 0.1 and 1 inch.

Figure 8:
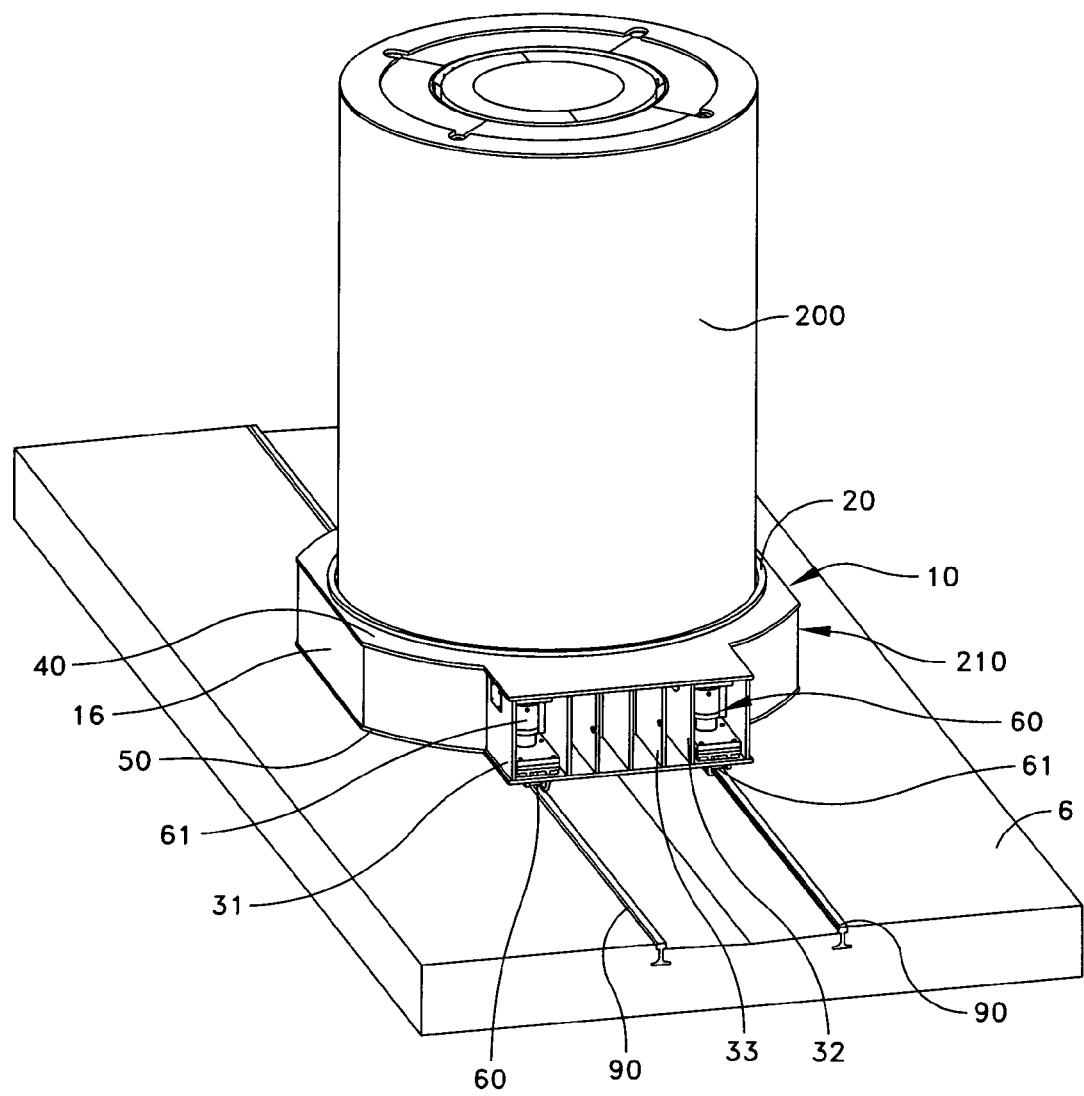
FIG. 8 is a perspective view of the low profile transporter and cask of FIG. 7 positioned on tracks of a ground surface according to one embodiment of the present invention.

Referring now to FIG. 8, the LPT 100 is designed to glide along rails 90 of a ground floor 6. More specifically rollers 60 are designed to fit within rails 90 so that the LPT 100 can be laterally moved (i.e. translated) along the floor 6. The bottom surface of container 212 does not touch the floor 6. The LPT 100 is designed so that the loaded container 200 can be transported underneath a doorway 14 (shown in FIG. 9).

Referring to FIGS. 6 through 8, a method of supporting and translating as storage cask 200 will now be discussed. The LPT 100 is positioned on the ground surface 6. The cask 200 is raised using a transporter 220 or any other crane like apparatus so that the bottom surface 212 of the cask 200 clears the tops surface of the upper plate 40 of the LPT 100. The cutouts 210 in the bottom surface 212 of the cask 200 are aligned with the contact plates 72 of the support members 70. the cask is lowered through the open top 12 end of the body 10 and into the cavity 23 of the LPT 100. The cask 200 is lowered until the cutouts 210 of the cask 200 are resting on the contact plate 72 of the support members 79. The rollers 61 are vertically moved into the extended position so that the rollers contact the ground surface 6. The LPT 100 is translated along the rails 90 (or on a ground surface having no rails). The rollers 61 are vertically moved so as to be raised from the ground surface. The support members 74 contact the ground surface 8 and the rollers 61 no longer support any weight of the LPT 100 or cask 200. Spent nuclear fuel is then loaded into the cask 200 by means known in the art. Such means of transferring spent nuclear fuel into storage casks including by resting a transfer cask (not shown) on top of the cask 200 so that the spent nuclear fuel can be transferred from the transfer cask into the storage cask. In such a transfer method, the full weight of the transfer cask and the cask 200 are supported by the LPT 100. The transfer cask is then removed from the cask 200. The rollers 61 of the LPT 100 are vertically moved into the extended position so that the rollers contact the ground surface 8. The LPT 100 and the fully loaded cask 200 are then translated. The LPT 100 and the cask 200 may be translated underneath overhead door 14. The LPT 100 can engage with the cask transporter 220 so that the cask 200 can be raised out of the cavity 23 until the bottom surface 210 of the cask 200 clears the top surface of the upper plate 40. The LPT 100 can be translated from underneath the cask 200 and the cask 200 lowered to the ground surface 6.

The foregoing description of the preferred embodiment of the invention has been presented for the purpose of illustration and description. It is not intended to be exhaustive or to limit the invention to the precise form disclosed. Many modifications and variations are possible in light of the above teaching.

What is claimed is:

1. A system for translating high level radioactive waste across a ground surface, the system comprising:
   a cask loaded with high level radioactive waste;
   an apparatus comprising:
      a support assembly comprising:
         a lowermost surface; and
         a body having a cavity having an open top end; and
      a plurality of rollers coupled to the body, each of the rollers being translatable along a vertical axis between: (1) an extended position in which the plurality of rollers contact the ground surface and support the support assembly above the ground surface; and (2) a retracted position in which the plurality of rollers do not contact the ground surface and the lowermost surface of the support assembly contacts the ground surface; and
      the cask positioned in the cavity, with a bottom surface of the cask positioned within the cavity, the cask supported above the ground surface by the lowermost surface of the support assembly when the plurality of rollers are in the extended position;
   wherein the support assembly further comprises at least one support member, each support member comprising a contact member coupled to the body and extending into the cavity, the cask positioned atop and in contact with the contact member;
   wherein each support member further comprises at least one support plate coupling the contact member to the body; and
   wherein the lowermost surface of the support assembly comprises the at least one support plate of each support member.

2. The system of claim 1 wherein a lower portion of the cask nests within the cavity of the body and an upper portion of the cask protrudes from the open top end of the cavity.

3. The system of claim 2 wherein the open top end of the cavity is formed in a top surface of the body.

4. The system of claim 1 wherein the cavity has a circular transverse cross-section and the cask has a circular transverse cross-section, and wherein an annular clearance exists between a lower portion of the cask that is located within the cavity and the body.

5. The system of claim 1 further comprising rails on the ground surface along which the plurality of rollers can translate when in the extended position.

6. The system of claim 1 wherein the cask comprises a plurality of cutouts in a bottom surface of the cask and the support assembly further comprises a plurality of support members, each support member comprising a contact member coupled to the body, and wherein each contact member nests within one of the cutouts and engages the cask.

7. The system of claim 1 wherein the lowermost surface of the support assembly comprises a plate.

8. The system of claim 7, wherein the lowermost surface of the support assembly comprises a planar surface of the plate.

9. A system for translating high level radioactive waste across a ground surface, the system comprising:
   a cask loaded with high level radioactive waste;
   an apparatus comprising:
      a body having a cavity having an open top end;
      at least one support member coupled to the body; and
      a plurality of rollers coupled to the body, each of the rollers being adjustable between: (1) an extended position in which the plurality of rollers contact the ground surface and support the body above the ground surface; and (2) a retracted position in which the plurality of rollers do not contact the ground surface and the at least one support member contacts the ground surface;
   a lower portion of the cask positioned in the cavity so that the cask contacts and rests atop the at least one support member and is above the ground surface, an upper portion of the cask protruding from the open top end of the cavity.

10. The system of claim 9 wherein the cavity extends along a substantially vertical axis, the body comprising a wall surface that circumferentially surrounds the substantially vertical axis.

11. The system of claim 9 wherein the cavity has a transverse cross-section having a closed geometry.

12. The system of claim 9 wherein the cask extends along a longitudinal axis, the cask supported by the apparatus so that the longitudinal axis is substantially vertical.

13. The system of claim 9 wherein an annular clearance exists between the lower portion of the cask and the body.

14. The system of claim 9 further comprising rails on the ground surface along which the plurality of rollers can translate.

15. The system of claim 9 wherein the cask is supported by the apparatus so that a bottom surface of the cask is a distance between 0.1 to 6 inches above the ground surface.

16. The system of claim 9, wherein each support member comprises a plate, and when the plurality of rollers are in the retracted position, the plate contacts the ground surface.

17. The system of claim 16, wherein each plate comprises a planar surface, and when the plurality of rollers are in the retracted position, the planar surface of each plate contacts the ground surface.

18. A system for translating high level radioactive waste across a ground surface, the system comprising:
   a cask loaded with high level radioactive waste;
   an apparatus comprising:
      a body having a cavity having an open top end; and
      a support member disposed on the body and comprising a plate assemblage;
      a plurality of rollers coupled to the body, each of the rollers being translatable along a vertical axis between: (1) an extended position in which the plurality of rollers contact the ground surface and support the body above the ground surface; and (2) a retracted position in which the plurality of rollers do not contact the ground surface and the plate assemblage contacts the ground surface;

the cask supported by the apparatus above the ground surface so that a lower portion of the cask is positioned within the cavity on the plate assemblage and an upper portion of the cask protrudes from the open top end of the cavity.

19. The system of claim 18 wherein the cavity has a transverse cross-section having a closed geometry.

20. The system of claim 18 wherein the cavity extends along a substantially vertical axis, the body comprising a wall surface that circumferentially surrounds the substantially vertical axis; wherein the cask extends along a longitudinal axis, the cask supported by the apparatus so that the longitudinal axis is substantially vertical; and wherein an annular clearance exists between the lower portion of the cask and the body.

21. The system of claim 18, wherein the plate assemblage comprises at least one lower plate, and when the plurality of rollers are in the retracted position, the at least one lower plate contacts the ground surface.

22. The system of claim 21, wherein each lower plate comprises a planar surface, and when the plurality of rollers are in the retracted position, the planar surface of each lower plate contacts the ground surface.

* * * * *